(12) United States Patent
You et al.

(10) Patent No.: US 7,160,030 B2
(45) Date of Patent: Jan. 9, 2007

(54) HYDRODYNAMIC BEARING AND APPARATUS FOR DRIVING POLYGONAL MIRROR USING THE SAME

(75) Inventors: Je-hwan You, Yongin-si (KR); Hyun-surk Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 104 days.

(21) Appl. No.: 11/081,078

(22) Filed: Mar. 16, 2005

(65) Prior Publication Data

US 2005/0213858 A1    Sep. 29, 2005

(30) Foreign Application Priority Data

Mar. 17, 2004    (KR) .................... 10-2004-0018003

(51) Int. Cl.
*F16C 32/06*    (2006.01)
(52) U.S. Cl. ...................... 384/107; 384/121
(58) Field of Classification Search ............... 384/100, 384/107, 108, 114, 121, 124; 310/90; 360/99.08, 360/98.07
See application file for complete search history.

(56) References Cited

U.S. PATENT DOCUMENTS 5,715,116 A * 2/1998 Moritan et al. ............. 384/107

FOREIGN PATENT DOCUMENTS

| JP | 2560426 | 10/1997 |
|---|---|---|
| JP | 10-238536 | 9/1998 |
| JP | 11-153130 | 6/1999 |
| JP | 2001-59522 | 3/2001 |
| JP | 2001-193732 | 7/2001 |
| JP | 2001-271828 | 10/2001 |
| JP | 2002-106549 | 4/2002 |
| JP | 2003-090331 | 3/2003 |
| JP | 2003-156036 | 5/2003 |
| KR | 1998-86268 | 12/1998 |

OTHER PUBLICATIONS

Korean Office Action issued Dec. 3, 2005, in Korean Patent Application No. 10-2004-0018003 which corresponds to U.S. Appl. No. 11/081,078.

* cited by examiner

*Primary Examiner*—Thomas R. Hannon
(74) *Attorney, Agent, or Firm*—Staas & Halsey LLP (57) ABSTRACT

A hydrodynamic bearing having an improved air discharging path for discharging air from the bearing when a shaft is inserted into the bearing, and an apparatus for driving a polygonal mirror using the hydrodynamic bearing. The hydrodynamic bearing includes: a bearing housing having a hollow portion filled with oil, and first and second stepped mounting recesses formed at one end of the hollow portion; a thrust plate installed in the first mounting recess so that one surface of the thrust plate is in contact with one end of the shaft, for supporting the shaft in a thrust direction, a diameter of the thrust plate being smaller than that of the first mounting recess: a first air discharging path formed at the thrust plate and/or the first mounting recess, for discharging air out of an inside of the bearing housing; a cap installed in the second mounting recess, for supporting a lower portion of the thrust plate; and a second air discharging path formed at the cap for communicating with the first air discharging path through a space between the thrust plate and the first mounting recess to discharge outwardly the air transferred from the first air discharging path.

20 Claims, 11 Drawing Sheets

HYDRODYNAMIC BEARING AND APPARATUS FOR DRIVING POLYGONAL MIRROR USING THE SAME

CROSS-REFERENCE TO RELATED APPLICATIONS

This application claims the priority of Korean Patent Application No. 10-2004-0018003, filed on Mar. 17, 2004, in the Korean Intellectual Property Office, the disclosure of which is incorporated herein in its entirety by reference.

BACKGROUND OF THE INVENTION

1. Field of the Invention

The present invention relates to a hydrodynamic bearing and apparatus for driving a polygonal mirror, and more particularly, to a hydrodynamic bearing having an improved air discharging path for discharging air from the bearing when a shaft is inserted into the bearing, and an apparatus for driving a polygonal mirror using the hydrodynamic bearing.

2. Description of the Related Art

A hydrodynamic bearing is widely utilized in an apparatus for driving a polygonal mirror in a laser printer at a fast constant rotation speed. To increase the printing yield, a printing speed of the laser printer must be increased. For this, the polygonal mirror must be rotated by driving apparatus at a high speed for long periods of time.

In order to satisfy this requirement, when the shaft is inserted into the hydrodynamic bearing, an oil film has to be formed around a circumference of the shaft. Since the formation of the oil film is obstructed by air existing in a housing of the hydrodynamic bearing, it is required to discharge the air from the housing when inserting the shaft.

Figure 1:
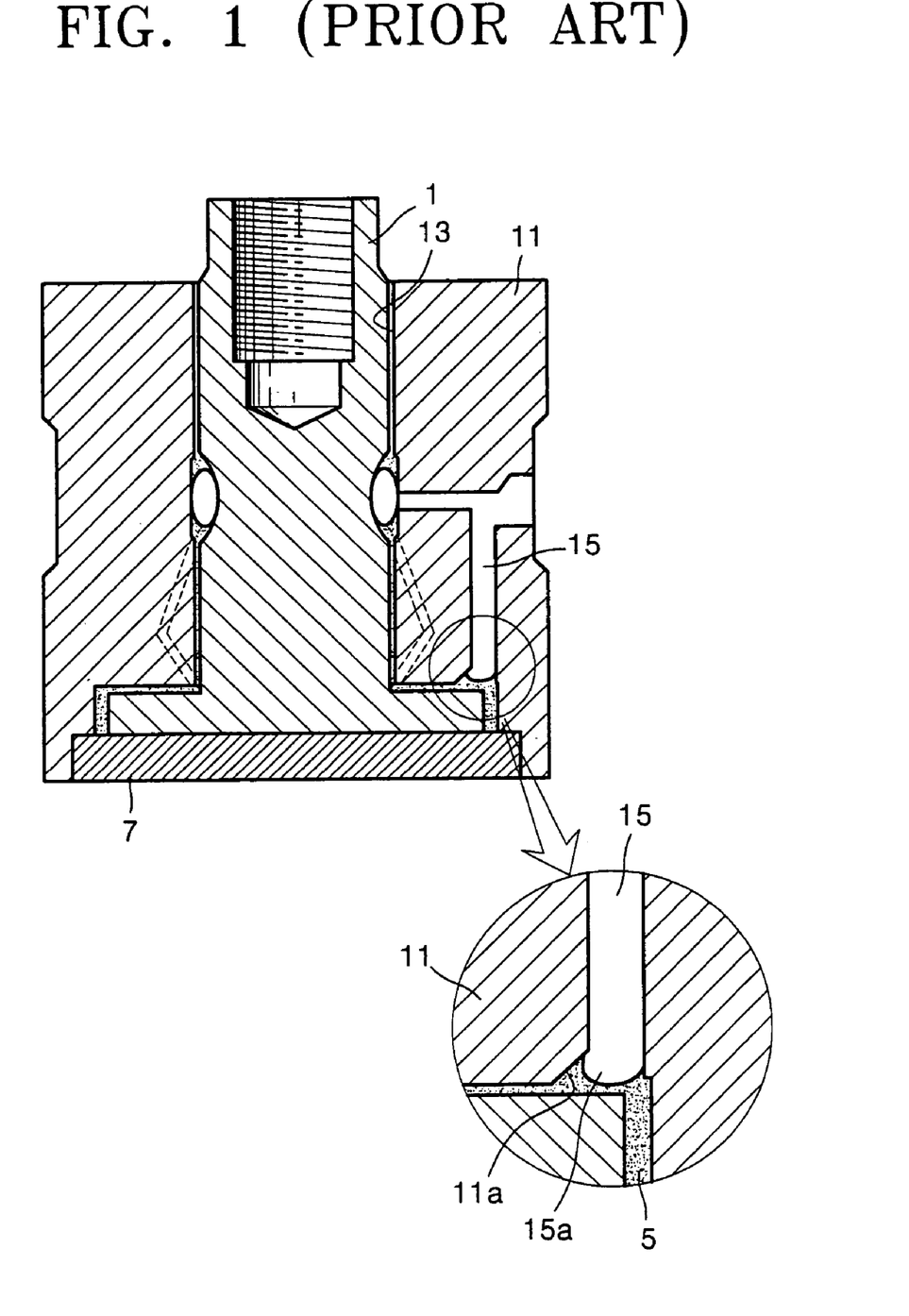
FIG. 1 is a cross-sectional view of a hydrodynamic bearing having a conventional air discharging structure.

FIG. 1 shows a hydrodynamic bearing having an air discharging structure, disclosed in Japanese Unexamined Patent Publication No. 2001-50257, entitled "dynamic pressure fluid bearing device and motor," published on Feb. 23, 2003.

Referring to FIG. 1, the hydrodynamic bearing rotatably supports a shaft 1, and includes a housing 11 having a clearance 13 filled with oil 5, and a cap 7 covering one end of the clearance 13 when the shaft 1 is inserted into the housing 11. The housing 11 has a ventilation hole 15 allowing the clearance 13 to communicate with the exterior. When the shaft 1 is inserted into the housing 11, and the oil 5 is introduced into the clearance 13, air in the clearance 13 is discharged outward through the ventilation hole 15, so that the air in the clearance 13 can be eliminated therefrom.

The ventilation hole 15 is widened at an opened end portion 15a thereof by an inclined surface 11a formed in the housing 11. An interface of the oil 5 is maintained at the inclined surface 11a by a surface tension, such that the redundant oil 5 not eliminated from the clearance 13 may stay in the opened end portion 15a.

The ventilation hole 15 has to be machined in a direction perpendicular to an inserting direction of the shaft 1 into the housing 11. When the hydrodynamic bearing is very small (a few mm in height), it is necessary to machine the ventilation hole having a diameter of several microns. However, such a machining process is very difficult, remarkably increasing a manufacturing cost and reducing productivity.

SUMMARY OF THE INVENTION

Embodiments of the present invention provide a hydrodynamic bearing having an easily machined air discharging path for discharging air from the hydrodynamic bearing when a shaft is inserted into the hydrodynamic bearing. Additional embodiments of the present invention provide an apparatus for driving a polygonal mirror using the hydrodynamic bearing.

Additional aspects and/or advantages of the invention will be set forth in part in the description which follows and, in part, will be obvious from the description, or may be learned by practice of the invention.

To achieve the above and/or other aspects and advantages, embodiments of the present invention include a hydrodynamic bearing rotatably supporting a shaft by hydrodynamic pressure, the hydrodynamic bearing including a bearing housing having a hollow portion receiving the shaft and filled with oil, and first and second stepped mounting recesses formed at one end of the hollow portion; a thrust plate installed in the first mounting recess so that one surface of the thrust plate is in contact with one end of the shaft, for supporting the shaft in a thrust direction, a diameter of the thrust plate being smaller than that of the first mounting recess; a first air discharging path formed in the thrust plate and/or the first mounting recess, for discharging air out of an inside of the bearing housing; a cap installed in the second mounting recess, for supporting a lower portion of the thrust plate; and a second air discharging path formed in the cap for communicating with the first air discharging path through a space between the thrust plate and the first mounting recess to discharge outwardly the air transferred from the first air discharging path.

The first air discharging path may include at least two spacing portions formed around a circumference of the thrust plate, and when the thrust plate is fitted in the first mounting recess, at least a part of the spacing portions is connected to the hollow portion.

The spacing portions may include first and second spacing portions each provided on both sides of the thrust plate in such a way that the spacing portions are symmetrical to each other with respect to a center of the thrust plate, at least one of the first and second spacing portions being connected to the hollow portion.

The thrust plate may have a circular shape with first and second cutaways formed symmetrically, each of the first and second spacing portions being formed between each of the first and second cutaways and a sidewall of the first mounting recess.

The thrust plate may have a circular shape with first and second indented cutaway surfaces indented symmetrically, each of the first and second spacing portions being formed between each of the first and second indented cutaway surfaces and a sidewall of the first mounting recess.

The first air discharging path may include at least two grooves formed on a bottom surface of the first mounting recess, and when the thrust plate is fitted in the first mounting recess, the hollow portion communicates with a space between the thrust plate and a sidewall of the first mounting recess.

The second air discharging path may include at least two grooves formed around the circumference of the cap, and when the cap is fitted into the second mounting recess, at least some of the grooves communicates with a space between the thrust plate and a sidewall of the first mounting recess.

The grooves may include first and second grooves each provided on both sides of the cap in such a way that the grooves are symmetrical to each other with respect to a center of the cap, at least one of the first and second grooves communicates with the space between the thrust plate and a sidewall of the first mounting recess.

The cap may have a circular shape with first and second indented surfaces indented symmetrically, each of the first and second grooves being formed between each of the first and second indented surfaces and a sidewall of the second mounting recess.

The first and second air discharging paths may be caulked by a caulking portion after the air is discharged outwardly from the hydrodynamic bearing, wherein the caulking portion may be sealed by a sealing member.

To achieve the above and/or other aspects and advantages, embodiments of the present invention include an apparatus for driving a polygonal mirror comprising: a base; a hydrodynamic bearing; a shaft rotatably installed in the hydrodynamic bearing; a driving source installed in the hydrodynamic bearing for rotationally driving the shaft using an electromagnetic force; and a polygonal mirror installed at the shaft for deflecting an incident light, wherein the hydrodynamic bearing includes a bearing housing having a hollow portion receiving the shaft and filled with oil, and first and second stepped mounting recesses formed at one end of the hollow portion; a thrust plate installed in the first mounting recess so that one surface of the thrust plate is in contact with one end of the shaft, for supporting the shaft in a thrust direction, a diameter of the thrust plate being smaller than that of the first mounting recess; a first air discharging path formed in the thrust plate and/or the first mounting recess, for discharging air out of an inside of the bearing housing; a cap installed in the second mounting recess, for supporting a lower portion of the thrust plate; and a second air discharging path formed in the cap for communicating with the first air discharging path through a space between the thrust plate and the first mounting recess to discharge outwardly the air transferred from the first air discharging path.

In exemplary embodiments of an apparatus for driving a polygonal mirror, the first air discharging path may include at least two spacing portions formed around a circumference of the thrust plate, and when the thrust plate is fitted into the first mounting recess, at least a part of the spacing portions is connected to the hollow portion.

In exemplary embodiments of an apparatus for driving a polygonal mirror, the spacing portions may include first and second spacing portions each provided on both sides of the thrust plate in such a way that the spacing portions are symmetrical to each other with respect to a center of the thrust plate, at least one of the first and second spacing portions being connected to the hollow portion.

In exemplary embodiments of an apparatus for driving a polygonal mirror, the thrust plate may have a circular shape with first and second cutaways formed symmetrically, each of the first and second spacing portions being formed between each of the first and second cutaways and a sidewall of the first mounting recess.

In exemplary embodiments of an apparatus for driving a polygonal mirror, the thrust plate may have a circular shape with first and second indented cutaway surfaces indented symmetrically, each of the first and second spacing portions being formed between each of the first and second indented cutaway surfaces and a sidewall of the first mounting recess.

In exemplary embodiments of an apparatus for driving a polygonal mirror, the first air discharging path may include at least two grooves formed on a bottom surface of the first mounting recess, and when the thrust plate is fitted into the first mounting recess, the hollow portion communicates with a space between the thrust plate and a sidewall of the first mounting recess.

In exemplary embodiments of an apparatus for driving a polygonal mirror, the second air discharging path may include at least two grooves formed around the circumference of the cap, and when the cap is fitted into the second mounting recess, at least some of the grooves communicates with a space between the thrust plate and a sidewall of the first mounting recess.

In exemplary embodiments of an apparatus for driving a polygonal mirror, the grooves may include first and second grooves each provided on both sides of the cap in such a way that the grooves are symmetrical to each other with respect to a center of the cap, at least one of the first and second grooves communicates with the space between the thrust plate and a sidewall of the first mounting recess.

In exemplary embodiments of an apparatus for driving a polygonal mirror, the cap may have a circular shape with first and second indented surfaces indented symmetrically, each of the first and second grooves being formed between each of the first and second indented surfaces and a sidewall of the second mounting recess.

In exemplary embodiments of an apparatus for driving a polygonal mirror, the first and second air discharging paths may be caulked by a caulking portion after the air is discharged outwardly from the hydrodynamic bearing, wherein the caulking portion may be sealed by a sealing member.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIGS. 2 through 5, a hydrodynamic bearing according to a first embodiment of the present invention includes a bearing housing 31 rotatably supporting a shaft 21 by a hydrodynamic pressure, a thrust plate 41 supporting the shaft 21 in an axial direction of the shaft 21, a cap 45 supporting the thrust plate 41, and an air discharging path for discharging air outwardly from the bearing housing 31.

Figure 2:
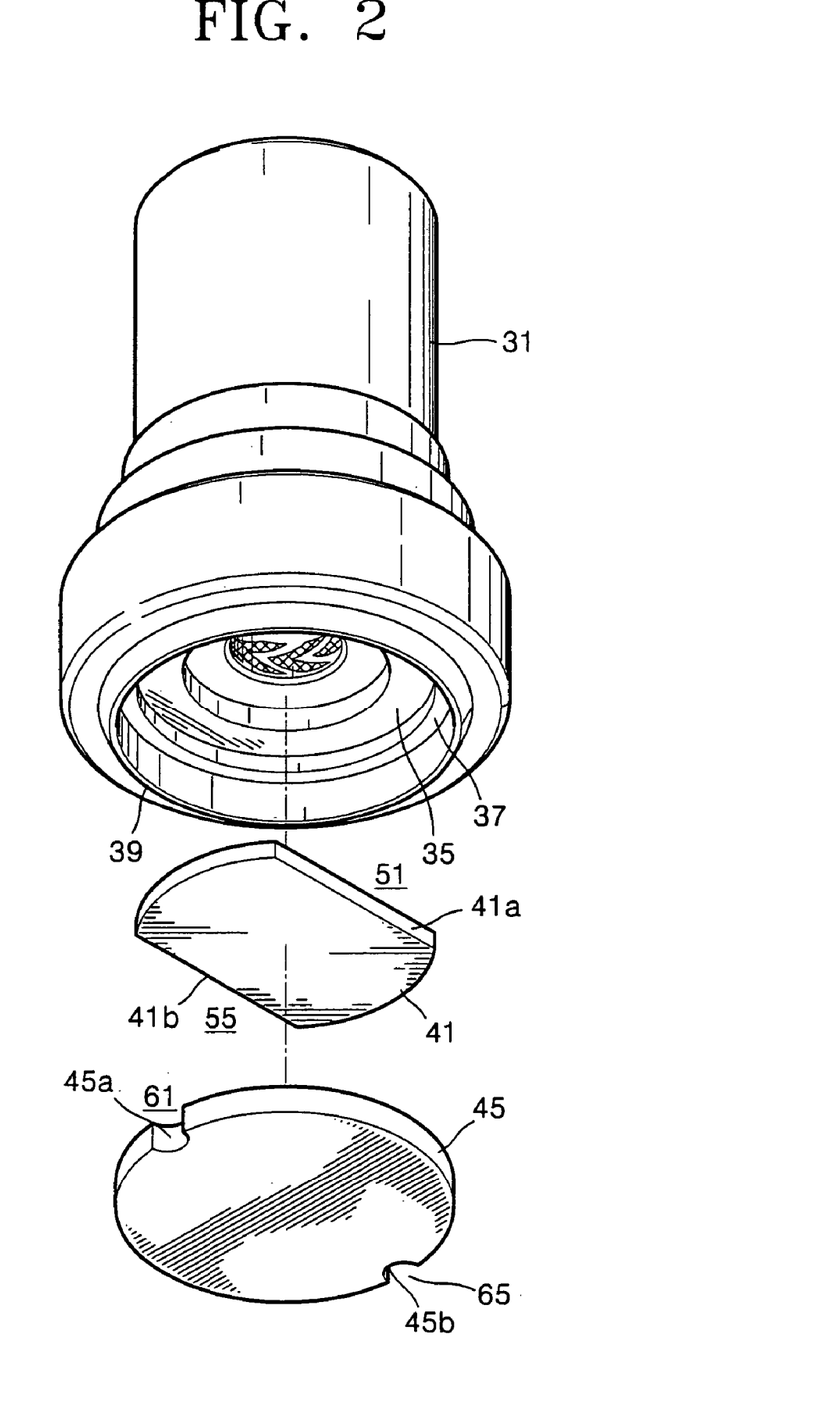
FIG. 2 is an exploded perspective view of a hydrodynamic bearing according to a first exemplary embodiment of the present invention.
Figure 3:
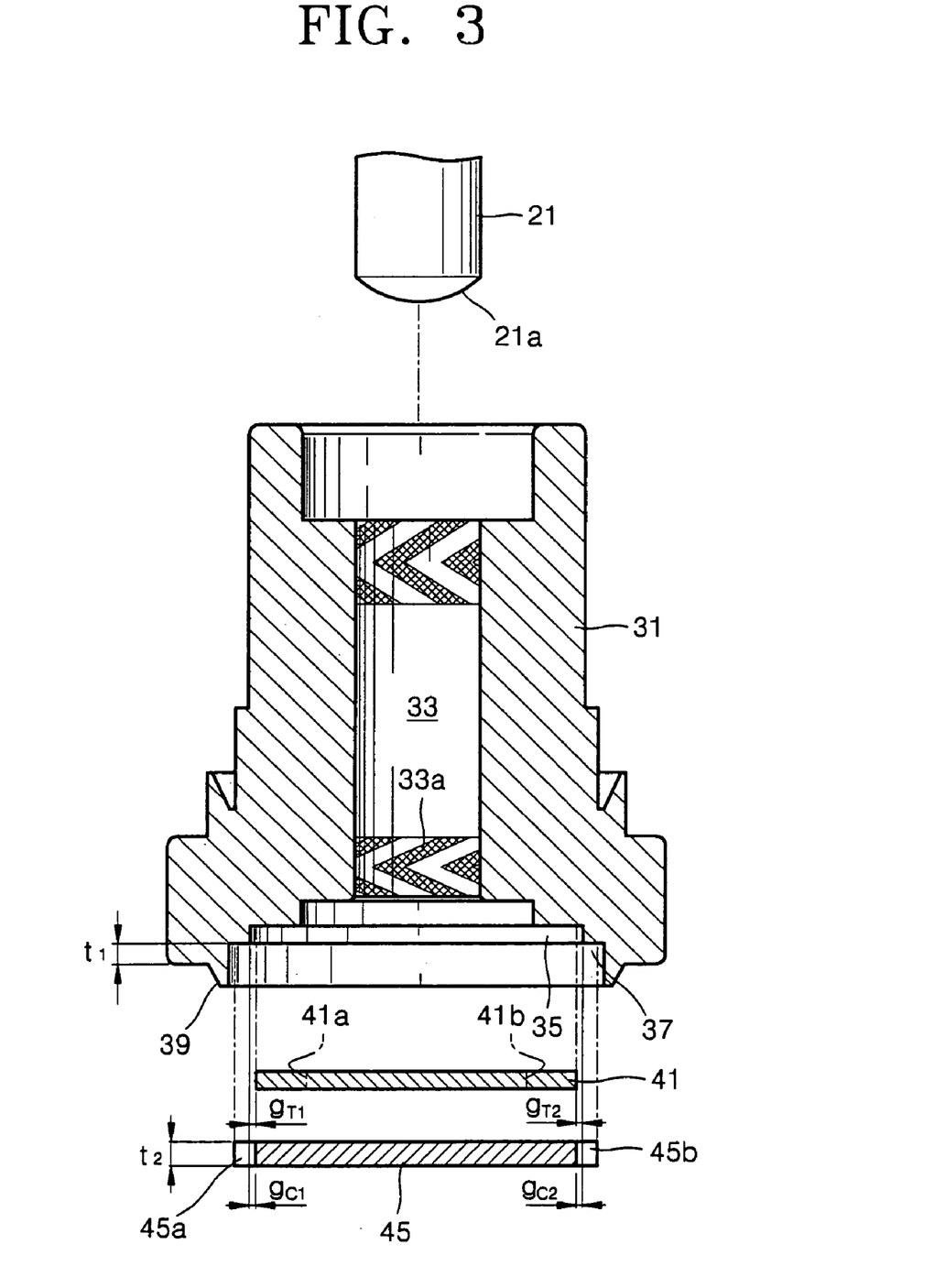
FIG. 3 is an exploded cross-sectional view of the first exemplary embodiment of the hydrodynamic bearing and a shaft in FIG. 2.

The bearing housing 31 includes a hollow portion 33 receiving the shaft 21 and filled with oil, and first and second stepped mounting recesses 35 and 37 formed at one end of the hollow portion 33. The hollow portion 33 is provided on an inner surface thereof with a herringbone groove 33a for generating a hydrodynamic pressure during the rotation of the shaft 21. The first mounting recess 35 and the second mounting recess 37 are formed in circular shapes of different diameters.

The first mounting recess 35 has a small diameter relative to that of the second mounting recess 37, and the thrust plate 41 is engaged with the first mounting recess. The thrust plate 41 is configured to have a circular plate shape with a cutaway formed on at least a portion of a circumference thereof. Preferably, the cutaway is composed of first and second cutaways 41a and 41b symmetrically formed to each other. A space is formed between each of the first and second cutaways 41a and 41b and a sidewall A of the first mounting recess 35. The gaps and space are utilized as a first air discharging path, which will be described in detail hereinafter. The thrust plate 41 is contacted at its surface facing the shaft 21 with a rounded end 21a of the shaft 21 to support the shaft 21 in a thrust direction. Since the diameter of the thrust plate 41 is smaller than that of the first mounting recess 35, it is easy to maintain a tolerance and engage the thrust plate 41 to the first mounting recess 35. Specifically, the diameter of the first mounting recess 35 is equal to the sum of gaps gT1 and gT2 and the diameter of the thrust plate 41, as shown in FIG. 3. Dimensions of the gaps gT1 and gT2 may vary depending upon a mounting state of the thrust plate 41. The gaps gT1 and gT2 are necessarily formed on at least a portion of a clearance between the first mounting recess 35 and the thrust plate 41.

The second mounting recess 37 has a depth t1, and the cap 45 of a thickness t2 is fitted into the second mounting recess 37. The cap 45 supports the thrust plate 41 and prevents the oil from flowing out of the hollow portion 33. In addition, the cap 45 is configured to have a circular plate shape with an indented surface formed on at least a portion of a circumference thereof. Preferably, the indented surface is composed of first and second indented surfaces 45a and 45b symmetrically formed to each other. A groove is formed between each of the first and second indented surfaces 45a and 45b and a sidewall B of the second mounting recess 37. The groove is utilized as a second air discharging path, which will be described in detail hereinafter.

The bearing housing 31 is displaced around the first and second mounting recesses 35 and 37, and includes a caulking portion 39 protruding outwardly from the first and second mounting recesses 35 and 37.

When the shaft 21 is fitted into the hollow portion 33, the air discharging path minimizes the spill of the oil from the hollow portion 33, and discharges the air from the hollow portion 33. The air discharging path is classified into first and second air discharging paths according to a position at which the path is formed. The first air discharging path includes at least two spacing portions 51 and 55 formed around a circumference of the thrust plate 41. The spacing portions 51 and 55 allow the hollow portion 33 to communicate with at least one portion of the gaps gT1 and gT2 formed between the circumference of the thrust plate 41 and the first mounting recess 35.

To this end, when the thrust plate 41 is fitted into the first mounting recess 35, at least a part of the spacing portions 51 and 55 is connected to the hollow portion 33. Preferably, the spacing portions consist of first and second spacing portions 51 and 55 each provided on both sides of the thrust plate 41 in such a way that the spacing portions are symmetrical to each other with respect to a center of the thrust plate 41, as shown in FIGS. 2 and 4A through 4C. By forming the first and second spacing portions 51 and 55 symmetrically, the spacing portion is always formed regardless of the fitting direction and position of the thrust plate 41, which will be described in detail hereinafter.

The second air discharging path includes at least two grooves 61 and 65 formed around the circumference of the cap 45. The grooves 61 and 65 allow at least one portion of the gaps gT1 and gT2 to communicate with the exterior. Preferably, the grooves consist of first and second grooves 61 and 65 each provided on both sides of the cap 45 in such a way that the first and second grooves 61 and 65 are symmetrical to each other on the basis of a center of the cap. Referring to FIG. 3, a space formed between one end portion of the thrust plate 41 and the first groove 61 has a width gc1, while a space formed between the other end portion of the thrust plate 41 and the second groove 65 has a width gc2. The widths gc1 and gc2 are variable, and the space is always formed at any portion of the positions, regardless of the mounting position of the cap 45.

By forming the first and second grooves 61 and 65 symmetrically, the second air discharging path is always in contact with the first air discharging path, regardless of the fitting direction and position of the cap 45.

Figure 4A:
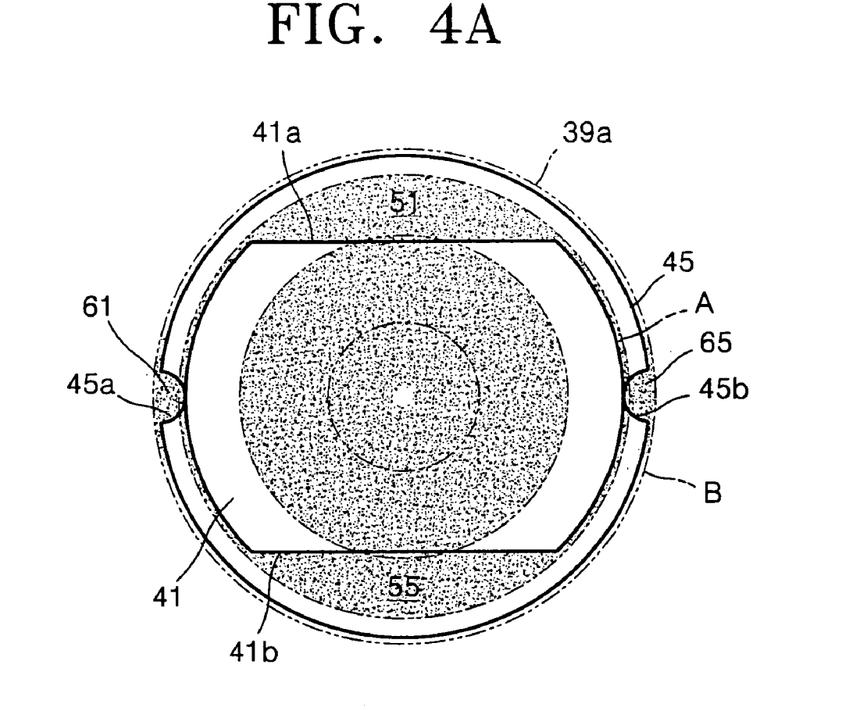
FIGS. 4a through 4c are schematic views illustrating an air discharging path of the first exemplary embodiment shown in FIG. 2.
Figure 4B:
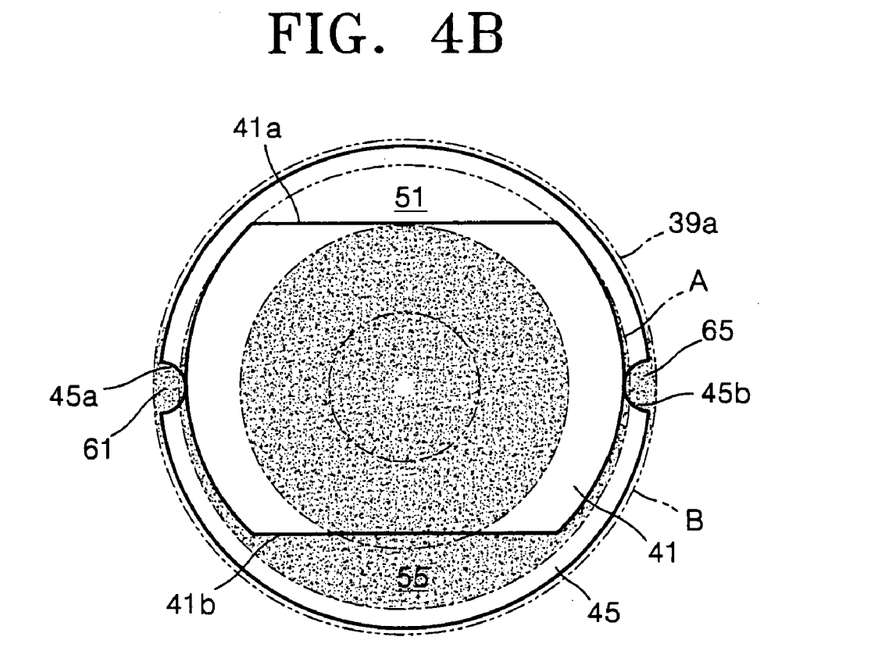
Figure 4C:
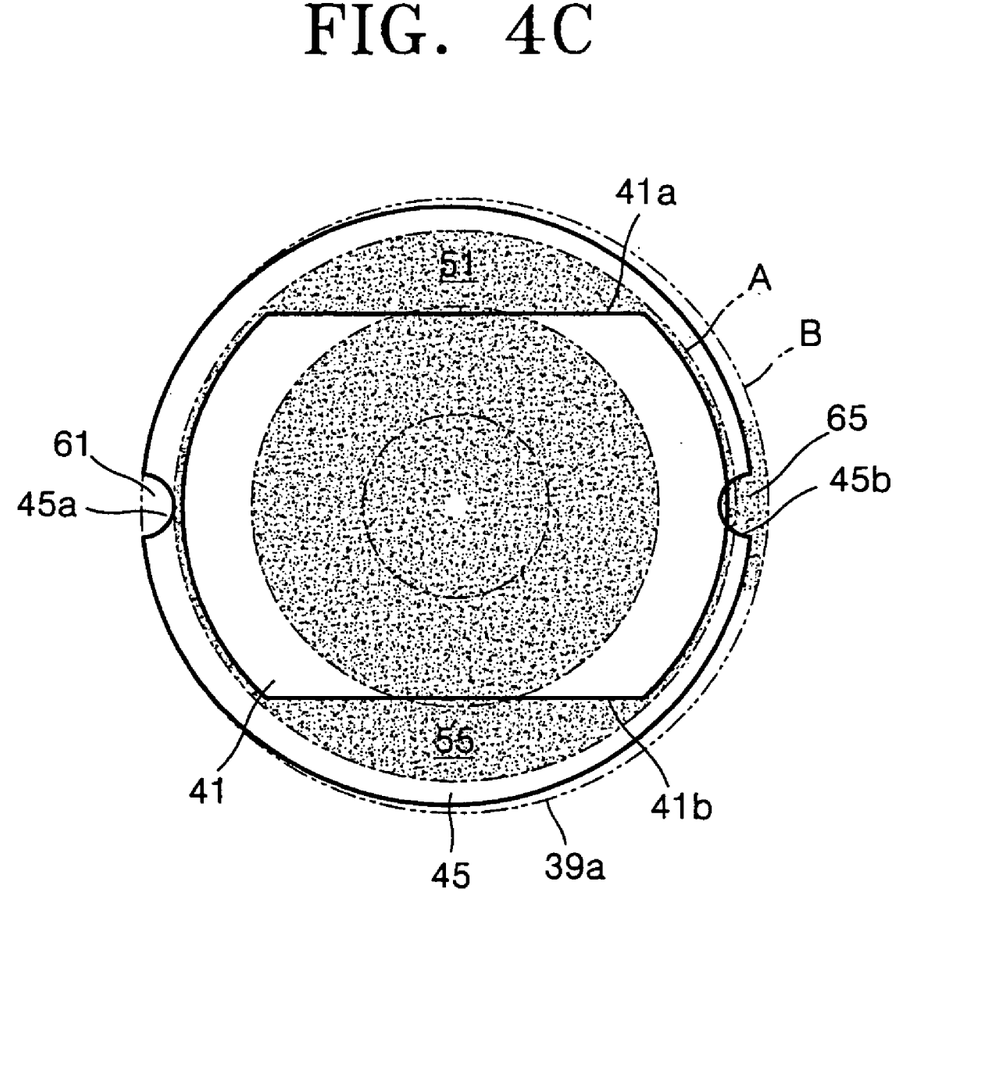

Reference is now made to FIGS. 4A through 4C to describe the first and second air discharging paths in detail. FIGS. 4A through 4C show the fitting states of the thrust plate 41 and the cap 45, respectively, in which an area indicated by dots denotes a discharging state of the air.

Reference numeral A denotes an inner wall of the first mounting recess 35, and reference numeral B denotes an inner wall of the second mounting recess 37.

FIG. 4A shows the thrust plate 41 and the cap 45 each fitted into the first and second mounting recesses 35 and 37, without eccentricity. When the shaft 21 is inserted into the hollow portion 33, the air in the hollow portion 33 is expanded to the first spacing portion 51 and the second spacing portion 55, and then flows through the gap between the first mounting recess 35 and the thrust plate 41. Consequently the air is discharged to the exterior through the first and second grooves 61 and 65.

FIG. 4B shows the thrust plate 41 eccentrically fitted into the first mounting recess 35 and the cap 45 fitted into the second mounting recess 37 without eccentricity. In this case, the first spacing portion 51 is not provided with an air flow path, while the second spacing portion 55 is provided with a relatively wide air flow path. Consequently, when the shaft 21 is inserted into the hollow portion 33, the air existed in the hollow portion 33 is expanded to the second spacing portion 55, and then flows through the gap between the first mounting recess 35 and the thrust plate 41. The air is discharged to the exterior through the first and second grooves 61 and 65.

FIG. 4C shows the thrust plate 41 fitted into the first mounting recess 35 without eccentricity and the cap 45 eccentrically fitted into the second mounting recess 37. In this case, the first groove 61 is closed, and does not form an air flow path, while the second groove 62 is opened. Consequently, when the shaft 21 is inserted into the hollow portion 33, the air existed in the hollow portion 33 is expanded to the first spacing portion 51 and the second spacing portion 55, and then flows through the gap between the first mounting recess 35 and the thrust plate 41. The air is discharged to the exterior through the second groove 65.

The air discharging path is also formed when the thrust plate 41 and the cap 45 are eccentrically placed or the fitting direction thereof is altered.

Therefore, after the thrust plate 41 and the cap 45 are fitted into the first and second mounting recesses 35 and 37, respectively, and the air is discharged, the grooves 61 and 65 and the gaps gC1 and gC2 are blocked through a caulking and sealing process to prevent the oil from being spilled.

Figure 5:
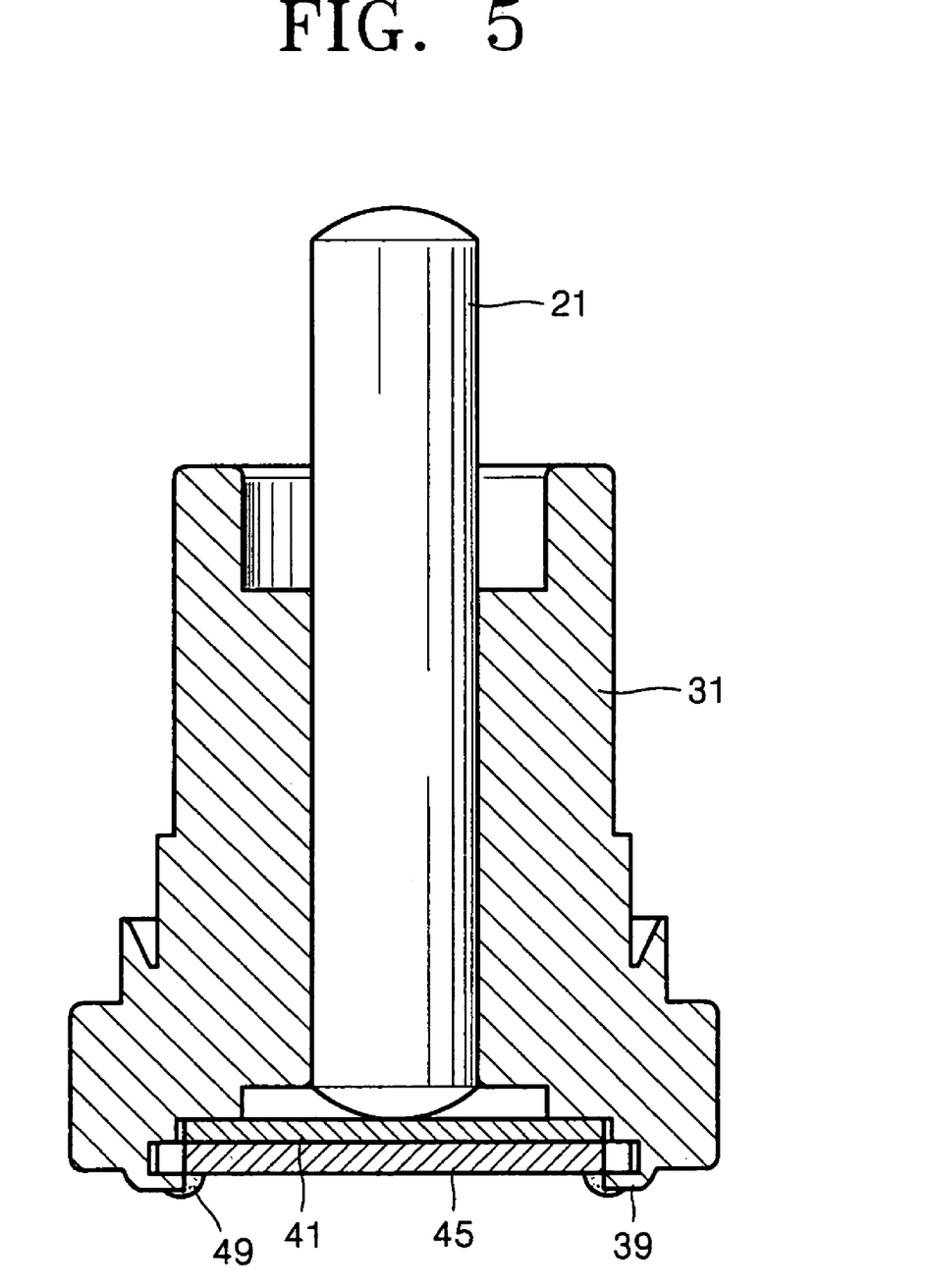
FIG. 5 is a cross-sectional view illustrating the first exemplary embodiment of the hydrodynamic bearing shown in FIG. 2.

Referring to FIG. 5, the caulking portion 39 is bent through the caulking process to secure the thrust plate 41 and the cap 45. Preferably, the thickness t2 of the cap 45 is thicker than the depth t1 of the second mounting recess 37, so that a portion of the cap is exposed outwardly from the second mounting recess 37 (referring to FIG. 4). Consequently, the cap 45 may be secured by the caulking portion 39. After the caulking process, the caulking portion 39 is sealed by a sealing member 49 made of ultra violet curable resin.

Figure 6:
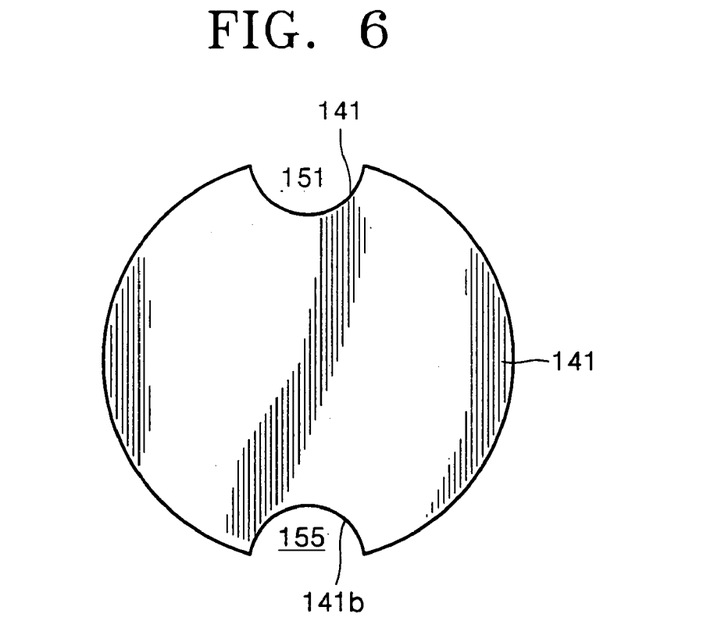
FIG. 6 is a top view illustrating a thrust plate of a hydrodynamic bearing according to a second exemplary embodiment of the present invention.
Figure 7:
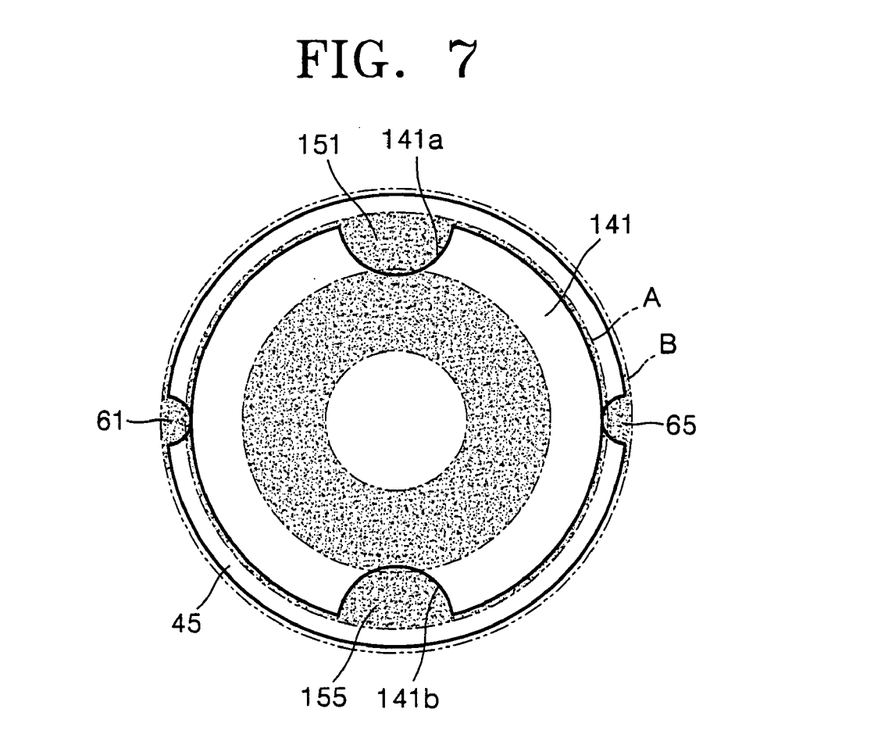
FIG. 7 is a schematic view illustrating an air discharging path of a hydrodynamic bearing according to the second exemplary embodiment of the present invention.

Referring to FIGS. 6 and 7, the hydrodynamic pressure bearing according to a second embodiment of the present invention is characterized in that a shape of a thrust plate is altered to form a different first air discharging path. Other components are substantially the same as those of the hydrodynamic bearing according to the first embodiment described with reference to FIGS. 2 through 5, and detailed descriptions thereof will be omitted.

Referring to FIG. 6, a thrust plate 141 is contacted at its surface facing the shaft (reference numeral 21 in FIG. 2) with a rounded end of the shaft. Since a diameter of the thrust plate 141 is smaller than that of the first mounting recess (reference numeral 35 in FIG. 2), it is easy to maintain a tolerance and engage the thrust plate 141 with the first mounting recess. The thrust plate 141 is configured to have a circular shape with a cutaway locally formed on at least a portion of a circumference thereof. Preferably, the cutaway is composed of first and second cutaways 141a and 141b symmetrically formed to each other. First and second spacing portions 151 and 155 are formed between each of the first and second cutaways 141a and 141b and a sidewall A of a first mounting recess. The first and/or second spacing portions 151 and 155 communicate with a hollow portion, regardless of a mounting position of the thrust plate 141 to the first mounting recess 35.

As shown in FIG. 7, the air may be discharged through the air discharging path. FIG. 7 shows the thrust plate 141 and the cap 45 each fitted into the first and second mounting recesses, without eccentricity. Reference numeral A denotes an inner wall of the first mounting recess and reference numeral B denotes an inner wall of the second mounting recess (reference numeral 37 in FIG. 2).

When the shaft is inserted into the hollow portion, air in the hollow portion is expanded to the first spacing portion 151 and the second spacing portion 155, and then flows through the gap between the inner wall A of the first mounting recess and the thrust plate 141. The air is discharged to the exterior through first and second grooves (reference numerals 61 and 65 in FIG. 2).

When the thrust plate 141 and/or a cap (reference numeral 45 in FIG. 2) are eccentrically displaced or the fitting direction thereof is altered, the air discharging path is formed.

Figure 8:
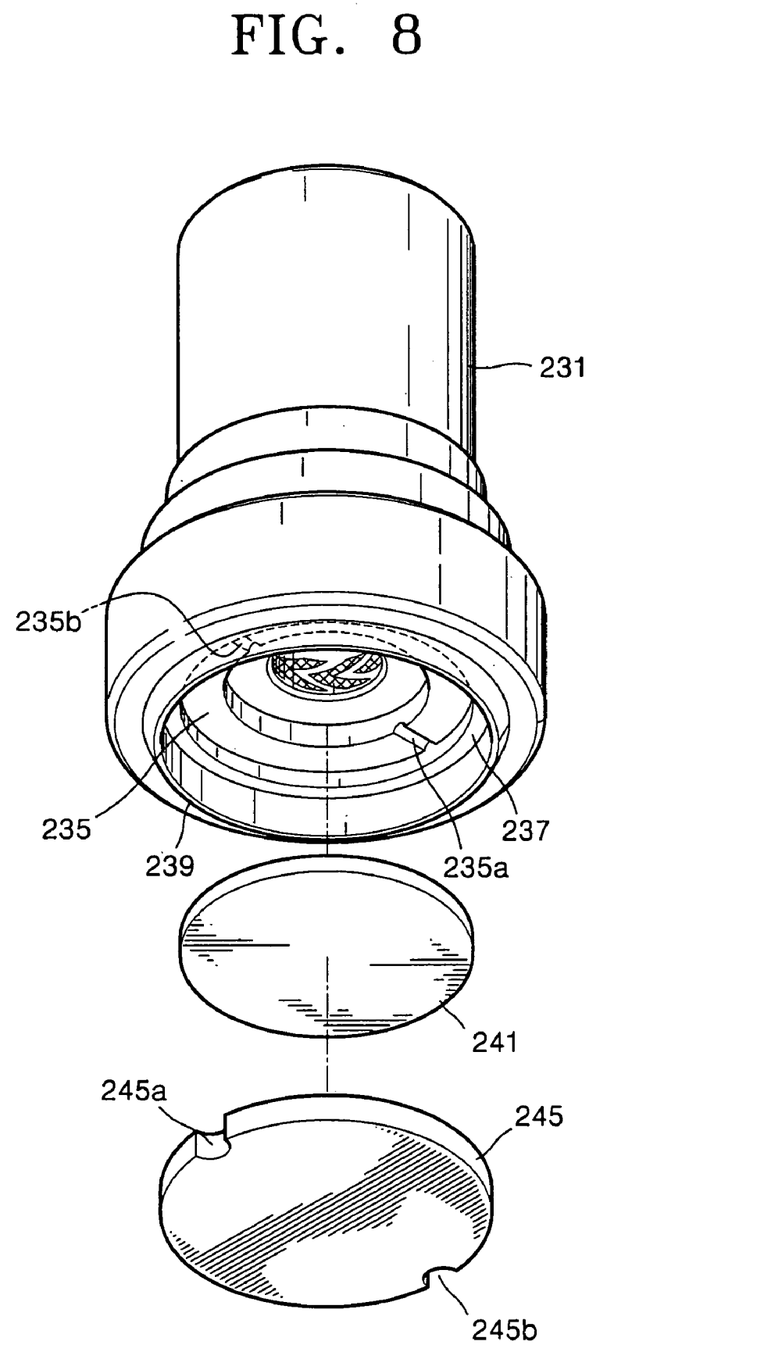
FIG. 8 is an exploded perspective view of a hydrodynamic bearing according to a third exemplary embodiment of the present invention.
Figure 9:
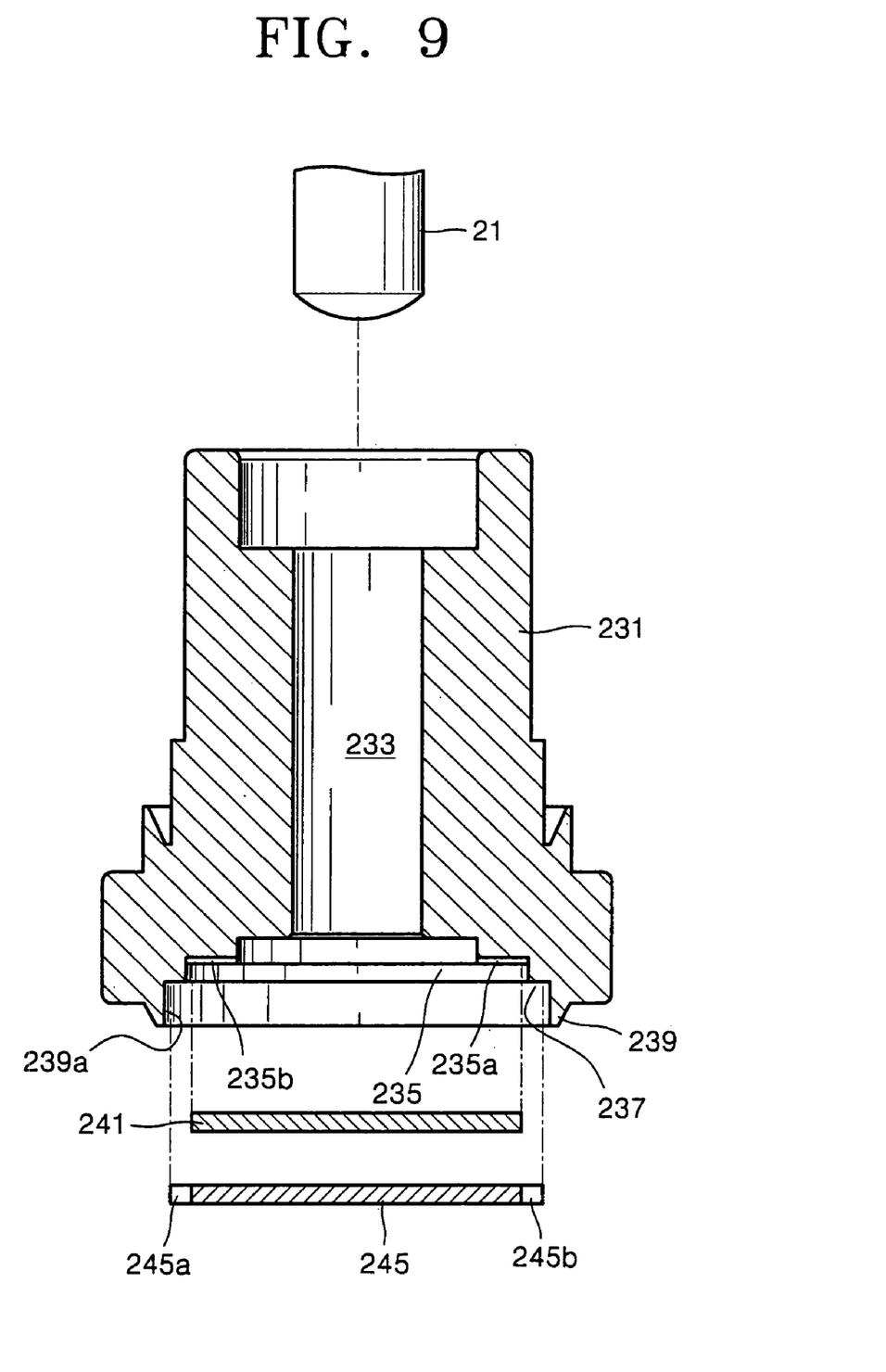
FIG. 9 is an exploded cross-sectional view illustrating the hydrodynamic bearing and a shaft of the third exemplary embodiment in FIG. 8.
Figure 10:
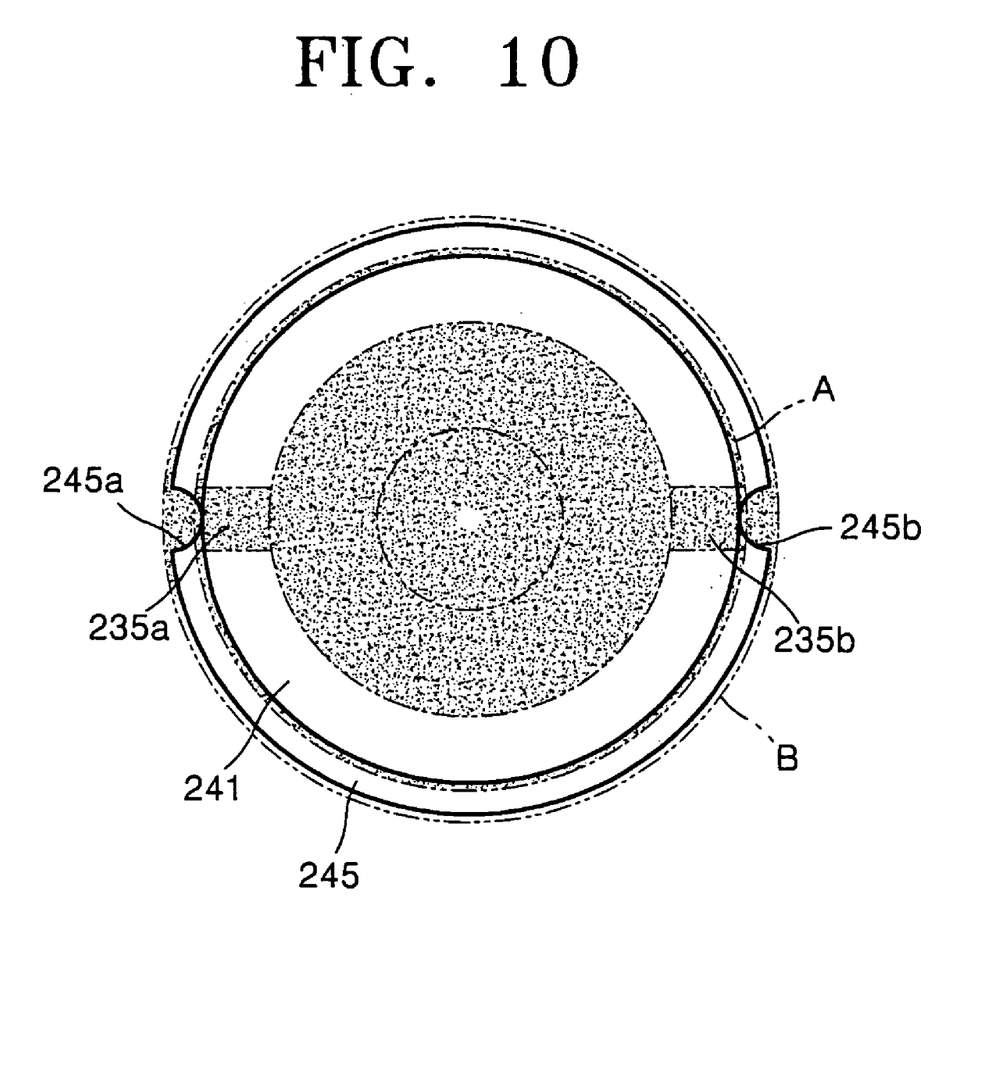
FIG. 10 is a schematic view illustrating an air discharging path of a hydrodynamic bearing according to the third exemplary embodiment of the present invention.

Referring to FIGS. 8 through 10, a hydrodynamic bearing according to a third embodiment of the present invention includes a bearing housing 231 rotatably supporting a shaft 21 using hydrodynamic pressure, a thrust plate 241 supporting the shaft 21 in an axial direction of the shaft 21, a cap 245 supporting the thrust plate 241 and having first and second cutaways 245a and 245b, and an air discharging path for discharging air outwardly from an inside of the bearing housing 231. When the shaft 21 is fitted into a hollow portion 233 formed in the bearing housing 231, the air discharging path minimizes the spill of the oil from the hollow portion 233, and discharges the air from an inside of the hollow portion 233. The air discharging path is classified into first and second air discharging paths according to a position at which the path is formed.

The bearing housing 231 includes the hollow portion 233 receiving the shaft 21 and filled with oil, and first and second stepped mounting recesses 235 and 237 formed at one end of the hollow portion 233. The first mounting recess 235 and the second mounting recess 237 are formed in circular shapes of different diameters.

The hydrodynamic bearing of the third embodiment is characterized in that the first air discharging path is altered. Other components are substantially the same as those of the hydrodynamic bearing according to the first and second embodiments described with reference to FIGS. 2 through 7. Consequently, only the first mounting recess 235 and the thrust plate 241 will be described, and detailed descriptions of other components will be omitted.

The first mounting recess 235 has a small diameter relative to that of the second mounting recess 237, and the thrust plate 241 is engaged to the first mounting recess 235. The thrust plate 241 has a circular plate shape having no cutaway, which is different from the thrust plate 41 in FIG. 2. The first mounting recess 235 is provided on a bottom surface thereof with at least two grooves 235a and 235b which form the first air discharging path. When the thrust plate 241 is fitted into the first mounting recess 235, the grooves 235a and 235b allow the hollow portion 233 to communicate with a space between an inner wall A of the first mounting recess 235 and the thrust plate 241.

As described above, by forming the first and second grooves 235a and 235b, a space is always formed regardless of the fitting direction and position of the thrust plate 241, thereby securing the air discharging path together with the second air discharging path.

Accordingly, as shown in FIG. 10, the air may be discharged from the hollow portion through the air discharging path. FIG. 10 shows the thrust plate 241 and the cap 245 each fitted into the first and second mounting recesses 235 and 237, without eccentricity. Reference numeral A denotes an inner wall of the first mounting recess 235, while reference numeral B denotes an inner wall of the second mounting recess 237.

When the shaft 21 is inserted into the hollow portion 233, the air existed in the hollow portion 233 is expanded to the two grooves 235a and 235b, and then flows through the gap between the inner wall A of the first mounting recess 235 and the thrust plate 241. The air is discharged to the exterior through the space formed between first and second indented surfaces 245a and 245b and the inner wall B of the second mounting recess 237.

The air discharging path is also formed when the thrust plate 241 and/or the cap 245 are eccentrically displaced or the fitting direction thereof is altered.

Figure 11:
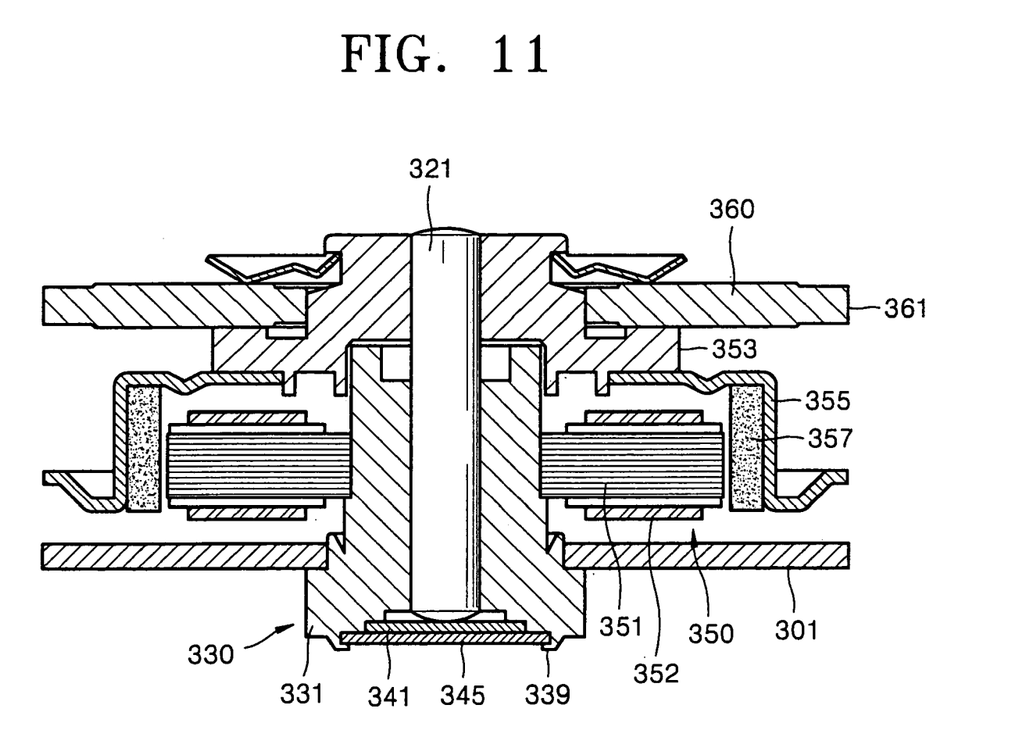
FIG. 11 is a cross-sectional view illustrating an apparatus for driving polygonal mirror according to an exemplary embodiment of the present invention.

Referring to FIG. 11, an apparatus for driving a polygonal mirror according to an embodiment of the present invention includes a base 301, a hydrodynamic bearing 330 secured to the base 301, a shaft 321 rotatably installed in the hydrodynamic bearing 330, a driving source 350, and a polygonal mirror 360.

The hydrodynamic bearing 330 includes a bearing housing 331 having a hollow portion filled with oil and a caulking portion 339, a thrust plate 341 installed in one end of the hollow portion, and a cap 345. Also, the hydrodynamic bearing 330 includes an air discharging path for discharging the residual air in the hollow portion.

The air discharging path has the same structure as that described with reference to FIGS. 2 through 10, and detailed descriptions thereof will be omitted.

The shaft 321 is rotatably installed in the hollow portion, and is driven by the driving source 350.

The driving source 350 is installed in the bearing housing 331 and the shaft 321 to rotate the shaft 321 using an electromagnetic force. The driving source 350 includes a stator core 351, a rotor frame 353, a rotor housing 355 and a magnet 357. The stator core 351 is fixed to a circumference of the bearing housing 331 and has a coil 352 wound around its circumference. The rotor frame 353 is installed to the shaft 321, and is provided on a circumference thereof with the polygonal mirror 360. The rotor housing 355 is engaged with the rotor frame 353 in such a way that it encloses a surrounding of the stator core 351. The magnet 357 is installed in the rotor housing 355 to face the stator core 351.

The polygonal mirror 360 is installed on the circumference of the rotor frame 353, and is driven by the driving source 350 to deflect an incident beam to each reflector 361 provided to a sidewall thereof.

According to the apparatus for driving a polygonal mirror configured as described above, when a current is applied to the coil 352, the rotor housing 355, the rotor frame 353 and the shaft 321 are rotated by the electromagnetic force between of the magnet 357 and the stator core 351, and thus the polygonal mirror 360 is rotatably driven to deflect the incident beam. When the apparatus for driving a polygonal mirror is used in a high-speed printer, the polygonal mirror is rotated at a high speed of about 30,000 rpm or more. At this time, the hydrodynamic bearing 330 effectively excludes the air in the hollow portion through the air discharging path, thereby stably supporting the rotating shaft 321.

The hydrodynamic bearing and the apparatus for driving a polygonal mirror using the same have a structure capable of discharging the air out of a hollow portion, thereby forming a normal oil film in the hollow portion. Therefore, a shaft can be effectively supported at a high rotating speed.

In addition, an air discharging structure can be always formed by altering a portion of a shape of the thrust plate, a bottom surface of a first mounting recess and a cap, regardless of a fitting position and direction of a thrust plate and the cap, so that a manufacturing cost may be lowered, and the assembling cost can be remarkably reduced.

Although a few exemplary embodiments of the present invention have been shown and described, it would be appreciated by those skilled in the art that changes may be made in these embodiments without departing from the principles, scope, and spirit of the invention, the scope of which is defined in the claims and their equivalents.

What is claimed is:

1. A hydrodynamic bearing rotatably supporting a shaft by hydrodynamic pressure, the hydrodynamic bearing comprising:
   a bearing housing having a hollow portion rotatably engaged with the shaft and filled with oil, and first and second stepped mounting recesses formed at one end of the hollow portion;
   a thrust plate installed in the first mounting recess so that one surface of the thrust plate is in contact with one end of the shaft, for supporting the shaft in a thrust direction, a diameter of the thrust plate being smaller than that of the first mounting recess;
   a first air discharging path formed at the thrust plate, the first mounting recess, or the thrust plate and the first mounting recess, for discharging air out of the bearing housing;
   a cap installed at the second mounting recess, for supporting a lower portion of the thrust plate; and
   a second air discharging path formed at the cap for communicating with the first air discharging path through a space between the thrust plate and the first mounting recess to discharge outwardly the air transferred from the first air discharging path.

2. The hydrodynamic bearing of claim 1, wherein the first air discharging path includes at least two spacing portions formed around a circumference of the thrust plate, and when the thrust plate is fitted in the first mounting recess, at least a part of the spacing portions is connected to the hollow portion.

3. The hydrodynamic bearing of claim 2, wherein the spacing portions comprise first and second spacing portions each provided on both sides of the thrust plate in such a way that the spacing portions are symmetrical to each other with respect to a center of the thrust plate, at least one of the first and second spacing portions being connected to the hollow portion.

4. The hydrodynamic bearing of claim 3, wherein the thrust plate has a circular shape with first and second cutaways formed symmetrically, each of the first and second spacing portions being formed between each of the first and second cutaways and a sidewall of the first mounting recess.

5. The hydrodynamic bearing of claim 3, wherein the thrust plate has a circular shape with first and second indented cutaway surfaces indented symmetrically, each of the first and second spacing portions being formed between each of the first and second indented cutaway surfaces and a sidewall of the first mounting recess.

6. The hydrodynamic bearing of claim 1, wherein the first air discharging path includes at least two grooves formed on a bottom surface of the first mounting recess, and when the thrust plate is fitted in the first mounting recess, the hollow portion communicates with a space between the thrust plate and a sidewall of the first mounting recess.

7. The hydrodynamic bearing of claim 1, wherein the second air discharging path includes at least two grooves formed around the circumference of the cap, and when the cap is fitted into the second mounting recess, at least some of the grooves communicates with a space between the thrust plate and a sidewall of the first mounting recess.

8. The hydrodynamic bearing of claim 7, wherein the grooves comprise first and second grooves each provided on both sides of the cap in such a way that the grooves are symmetrical to each other with respect to a center of the cap, at least one of the first and second grooves communicates with the space between the thrust plate and a sidewall of the first mounting recess.

9. The hydrodynamic bearing of claim 8, wherein the cap has a circular shape with first and second indented surfaces indented symmetrically, each of the first and second grooves being formed between each of the first and second indented surfaces and a sidewall of the second mounting recess.

10. The hydrodynamic bearing of claim 1, wherein the first and second air discharging paths are caulked by a caulking portion after the air is discharged outwardly from the hydrodynamic bearing, wherein the caulking portion is sealed by a sealing member.

11. An apparatus for driving a polygonal mirror comprising:
a base;
a hydrodynamic bearing;
a shaft rotatably installed in the hydrodynamic bearing;
a driving source installed to the hydrodynamic bearing and the shaft for rotationally driving the shaft using an electromagnetic force; and
a polygonal mirror installed to the shaft for deflecting an incident light,
the hydrodynamic bearing including:
a bearing housing having a hollow portion filled with oil, and first and second stepped mounting recesses formed at one end of the hollow portion;
a thrust plate installed at the first mounting recess in a manner that one surface of the thrust plate is in contact with one end of the shaft, for supporting the shaft in a thrust direction, a diameter of the thrust plate being smaller than that of the first mounting recess;
a first air discharging path formed at the thrust plate, the first mounting recess, or the thrust plate and the first mounting recess, for discharging air out of an inside of the bearing housing;
a cap installed in the second mounting recess, for supporting a lower portion of the thrust plate; and
a second air discharging path formed at the cap for communicating with the first air discharging path through a space between the thrust plate and the first mounting recess to discharge outwardly the air transferred from the first air discharging path.

12. The apparatus for driving a polygonal mirror of claim 11, wherein the first air discharging path includes at least two spacing portions formed around a circumference of the thrust plate, and when the thrust plate is fitted into the first mounting recess, at least a part of the spacing portions is connected to the hollow portion.

13. The apparatus for driving a polygonal mirror of claim 12, wherein the spacing portions comprise first and second spacing portions each provided on both sides of the thrust plate in such a way that the spacing portions are symmetrical to each other with respect to a center of the thrust plate, at least one of the first and second spacing portions being connected to the hollow portion.

14. The apparatus for driving a polygonal mirror of claim 13, wherein the thrust plate has a circular shape with first and second cutaways formed symmetrically, each of the first and second spacing portions being formed between each of the first and second cutaways and a sidewall of the first mounting recess.

15. The apparatus for driving a polygonal mirror of claim 13, wherein the thrust plate has a circular shape with first and second indented cutaway surfaces indented symmetrically, each of the first and second spacing portions being formed between each of the first and second indented cutaway surfaces and a sidewall of the first mounting recess.

16. The apparatus for driving a polygonal mirror of claim 11, wherein the first air discharging path includes at least two grooves formed on a bottom surface of the first mounting recess, and when the thrust plate is fitted into the first mounting recess, the hollow portion communicates with a space between the thrust plate and a sidewall of the first mounting recess.

17. The apparatus for driving a polygonal mirror of claim 11, wherein the second air discharging path includes at least two grooves formed around the circumference of the cap, and when the cap is fitted into the second mounting recess, at least some of the grooves communicates with a space between the thrust plate and a sidewall of the first mounting recess.

18. The apparatus for driving a polygonal mirror of claim 17, wherein the grooves comprise of first and second grooves each provided on both sides of the cap in such a way that the grooves are symmetrical to each other with respect to a center of the cap, at least one of the first and second grooves communicates with the space between the thrust plate and a sidewall of the first mounting recess.

19. The apparatus for driving a polygonal mirror of claim 18, wherein the cap has a circular shape with first and second indented surfaces indented symmetrically, each of the first and second grooves being formed between each of the first and second indented surfaces and a sidewall of the second mounting recess.

20. The apparatus for driving a polygonal mirror of claim 11, wherein the first and second air discharging paths are caulked by a caulking portion after the air is discharged outwardly from the hydrodynamic bearing, wherein the caulking portion is sealed by a sealing member.

* * * * *